June 8, 1965  A. P. STOLIAR  3,187,575
RESONANT BOLOMETER

Filed Jan. 7, 1963  3 Sheets-Sheet 1

INVENTOR.
ARTHUR P. STOLIAR
BY
ATTORNEY

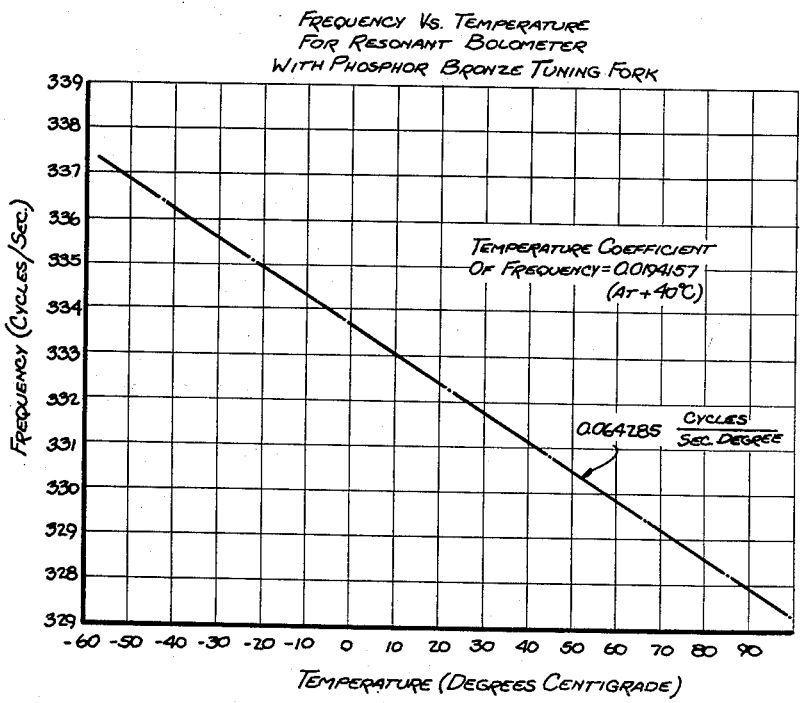

United States Patent Office 3,187,575
Patented June 8, 1965

3,187,575
RESONANT BOLOMETER
Arthur P. Stoliar, New York, N.Y., assignor to Bulova Watch Company, Inc., New York, N.Y., a corporation of New York
Filed Jan. 7, 1963, Ser. No. 249,678
6 Claims. (Cl. 73—355)

This invention relates generally to bolometers, and more particularly to a resonant transducer which generates an output wave whose frequency varies as a function of temperature.

A bolometer is an instrument adapted to measure radiant energy by sensing the temperature effect on a physical parameter. In one known form, temperature-sensitive resistors are used which may be of the thermistor type having a negative temperature coefficient of resistance, or of the barretter type having a positive coefficient. The sensitivity of such resistive bolometers is limited by Johnson noise. Other bolometers make use of thermal generators which produce a potential when heated.

When subjected to steady illumination or heating, conventional bolometers produce a direct-current output at a given level, D.-C. variations being developed as the illumination diminishes or increases. It is often necessary to transmit such D.-C. variations radiometrically or over lines so as to convey the bolometer reading to a remote point, as in the case of unattended weather stations. This is usually accomplished by modulating an oscillator with the varying D.-C. voltage to convert the bolometer signal into a frequency-modulated wave which is then demodulated at the receiving point.

For the purpose of effective transmission and accurate readings it is essential that the bolometer transmitter include an oscillator of high stability in conjunction with a linear frequency modulator. This combination of bolometer, oscillator and modulator is relatively complex and expensive, and is also a drawback where space is at a premium.

Accordingly, it is the main object of this invention to provide a resonant bolometer which directly produces a frequency-modulated signal in response to changes in temperature.

More specifically, it is an object of this invention to provide a bolometer in the form of an electrodynamically driven tuning fork formed of temperature-sensitive material, the fork circuit constituting a stable resonant transducer which generates an A.-C. voltage whose frequency is a function of temperature, the frequency remaining constant under steady state conditions.

Also an object of the invention is to provide a resonant bolometer of the above type which is adapted to measure radiant energy and is compensated for ambient temperature.

It is also an object of the invention to provide a resonant bolometer which is a self-sufficient, temperature-sensitive frequency-modulated oscillator of highly compact and efficient design, and which produces a relatively high output with low power consumption suitable for telemetry.

For a better understanding of the invention, as well as other objects and further features thereof, reference is made to the following detailed description to be read in conjunction with the accompanying drawing, wherein:

FIG. 4 shows the frequency vs. temperature for a resonant bolometer in accordance with the invention, using a Phosphor bronze tuning fork; and FIG. 5 schematically shows a bridge arrangement for a bolometer construction sensitive to radiant energy and compensated for ambient temperature variations.

GENERAL DESCRIPTION

Figure 1:
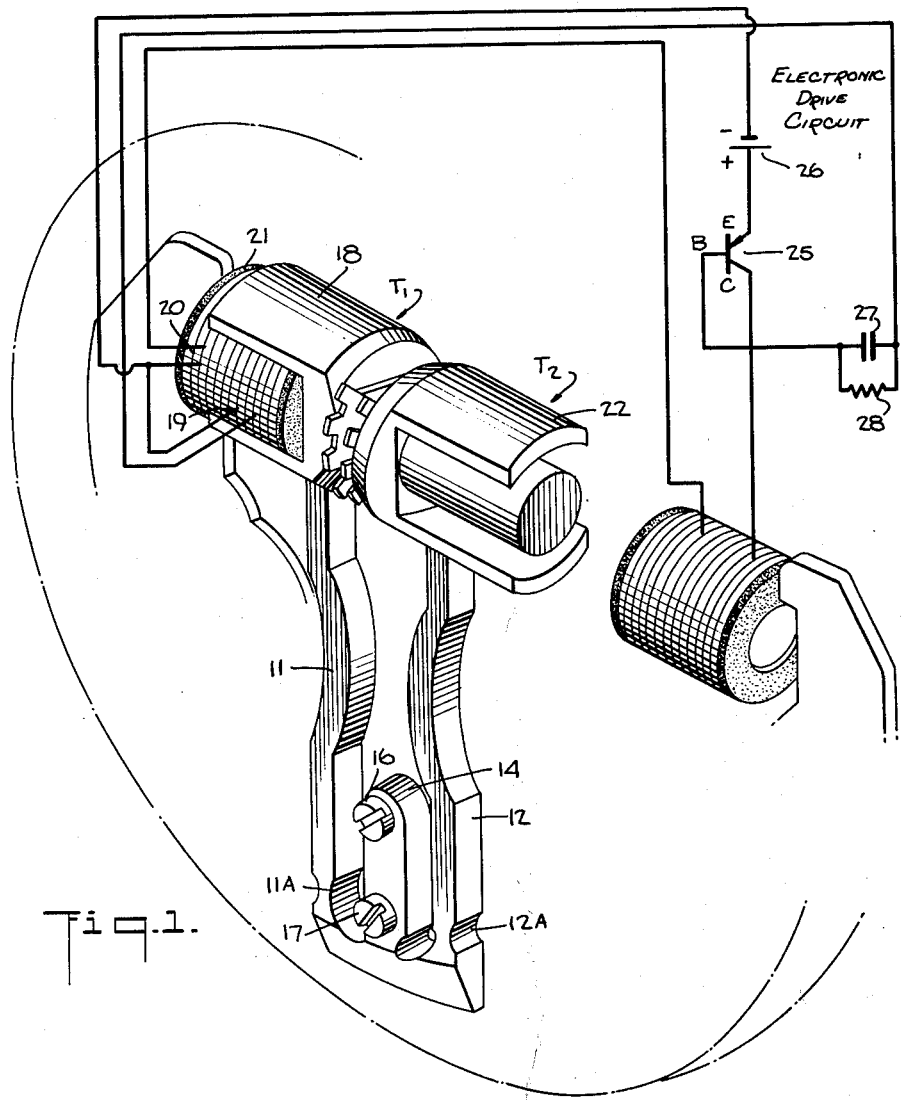
FIG. 1 is a schematic representation in perspective of the basic components of an electronic bolometer in accordance with the invention.
Figure 2:
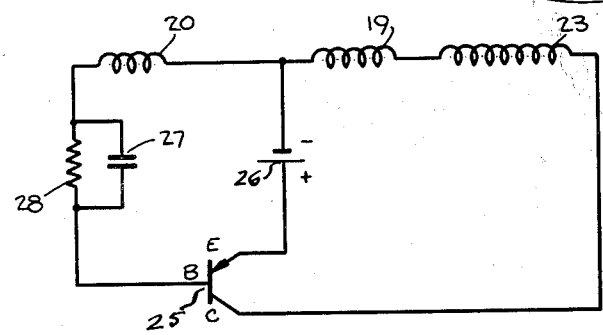
FIG. 2 is the electrical circuit diagram of the bolometer.

Referring now to the drawings, and more particularly to FIGS. 1 and 2, the bolometer in accordance with the invention includes a temperature-sensitive tuning fork generally designated by numeral 10. Tuning fork 10 is provided with a pair of flexible tines 11 and 12 interconnected by a relatively inflexible base 13, the base having an upwardly-extending stem 14 secured to a supporting plate 15 by suitable screws 16 and 17. The central area of the plate is cut out to permit unobstructed vibration of the tines. The roots 11A and 12A of the tines are constricted, the tines vibrating about these points.

The tuning fork is actuated by first and second transducers $T_1$ and $T_2$. Transducer $T_1$ is constituted by a magnetic element 18 secured to the free end of tine 11, the element coacting with a drive coil section 19 and a pick-up or phase sensing coil 20. The two coils are wound on an open-ended tubular carrier 21 affixed to a subassembly mounting form secured to the plate. The second transducer $T_2$ includes a magnetic element 22 secured to the free end of tine 12 and coacting with a drive coil section 23 wound by a tubular carrier. Magnetic elements 18 and 22 each are constituted by a permanent magnet core rod mounted within a cylindrical cup of magnetic material.

The electronic drive circuit for the fork comprises a transistor 25, a single-cell battery 26, and an R-C biasing network formed by condenser 27 shunted by resistor 28. Transistor 28, which may be of the germanium junction PNP type, is provided with base, emitter and collector electrodes designated B, E and C, respectively.

The base B is coupled through the R-C network 27-28 to one end of phase-sensing coil 29, the other end of which is connected to one end of drive coil section 19. The main drive coil section 23 is connected in series with drive coil section 19 to collector electrode C of the transistor.

Emitter E is connected to the positive terminal of battery 26, the negative terminal thereof being connected to the junction of drive coil 19 and phase-sensing coil 20. Thus battery 26 is connected serially through both drive coils 19 and 23 between the emitter and collector of the transistor, the collector being negative relative to the emitter. Battery 26 should be of the type providing a highly stable voltage (i.e., 1.3 volts) for almost the full duration of its useable life.

The interaction of the electronic drive circuit and the tuning fork is self-regulating and functions not only to cause the tines to oscillate at their natural frequency, but also to maintain oscillation at a substantially constant amplitude.

In operation, an energizing pulse applied to the drive coils of the transducers will cause an axial thrust on the associated magnetic element in a direction determined by the polarity of the pulse in relation to the polarization of the permanent magnet therein and to an extent depending on the energy of the pulse. Since the magnetic element is attached to a tine of the tuning fork, the thrust on the element acts mechanically to excite the fork into vibration.

The resultant movement of the magnetic element relative to the fixed coils induces a back E.M.F. in the drive coils, and in the case of transducer $T_1$ in the phase-sensing coil as well. Since the magnetic element reciprocates in accordance with the fork motion, the back E.M.F. will take the form of an alternating voltage whose frequency corresponds to the fork frequency. The voltage picked up by the sensing coil is applied to the base of the transistor to control the instant during each cycle when the driving pulse is to be delivered to the drive coils.

The two transducers are of like design except that transducer $T_1$ includes a phase-sensing coil 20 as well as a drive coil 19. The construction and behavior of the transducers is similar to that of a dynamic permanent magnetic speaker, save that the moving element is the magnet and not the coil.

When the tuning fork in the above-described transducer is formed of a metal such as invar, having a substantially zero temperature coefficient, the operating frequency of the transducer is determined by the natural frequency of the fork, and this frequency is highly stable, regardless of changes in ambient temperature. With a fork of less than one inch in length, it is possible to generate an oscillatory wave having a stable frequency of 360 cycles per second, and all of the associated drive elements in the tuning fork circuit including the battery, may be confined within a casing a little over an inch in diameter and less than one-half inch in depth.

In accordance with the invention, the turning fork transducer is rendered temperature-sensitive by using a fork material such as medium carbon steel having a high degree of sensitivity to temperature in the range normally of interest. A transducer in accordance with the invention can provide a temperature coefficient of frequency at room temperature, of 0.03 percent per degree, and the stability of the unit at a constant temperature permits a temperature resolution greater than 0.01° C.

TUNING FORK DESIGN

The factors involved in the tuning fork design will now be considered.

The sensitivity of the transducer is a function of the useful signal which is developed due to a change in temperature in the presence of the limiting noise voltages. The response of the fork assembly is based on the temperature coefficient of its natural frequency. For linear response, this coefficient should be constant over the temperature range of interest.

The random fluctuations which determine the minimum temperature variations which may be resolved by the devices are functions of the circuit stability and hysteresis. The natural frequency of a tuning fork is:

$$f = \frac{1}{2\pi}\sqrt{\frac{c}{m}} \text{ c.p.s.} \tag{1}$$

where $c$ is the spring constant, and
$m$ is the mass of one arm.

The spring constant $$c = \frac{F}{a} \tag{2}$$

where $F$ is the deflecting force, and
$a$ is the deflection of the fork arm.

The deflection $a$ is a function of the force and the fork dimensions, $$a = \frac{F}{E_1}\frac{l^3}{3} \tag{3}$$

where $l$ is the distance between the center of gravity of one arm and the center of the tuning fork.
$E$ is the modulus of elasticity.

$I$ is the moment of inertia of the fork.

Substituting (2) and (3) into (1), $$f = \frac{1}{2\pi}\sqrt{\frac{3EI}{ml^3}} \tag{4}$$

Since $I$ and $m$ are essentially independent of temperature, let $$\frac{1}{2\pi}\sqrt{\frac{3I}{m}} = \text{constant} = C_0 \tag{5}$$

$$f = C_0 \sqrt{\frac{E}{l^3}} \tag{6}$$

The variation of natural frequency with temperature is obtained by differentiating (6) with respect to temperature.

$$\frac{df}{dT} = \frac{C_0 \frac{l^{3/2}}{E}\frac{dE}{dT} - 3(EI)^{1/2}\frac{dl}{dT}}{2l^3} \tag{7}$$

$\frac{1}{E}\frac{dE}{dT} = e =$ the temperature coefficient of the modulus of elasticity (8)

$\frac{1}{l}\frac{dl}{dT} = \beta$, the temperature coefficient of linear expansion (9)

substituting (8) and (9) into (7) and reducing, gives $$\frac{df}{dT} = C_0 \sqrt{\frac{E}{l^3}}\frac{e - 3\beta}{2} \tag{10}$$

The temperature coefficient of the natural frequency $\alpha$, is defined as $$\alpha = \frac{1}{f}\frac{df}{dT} \tag{11}$$

Upon substituting (4), (5) and (10) into (11), the temperature coefficient becomes, $$\alpha = \frac{e - 3\beta}{2}\frac{\text{cycles}}{\text{sec.} - \text{degree}}$$

Average values for the temperature coefficient of the modulus of elasticity $e$ and the temperature coefficient of linear expansion, $\beta$, for various materials suitable for the application, are given in Table I.

*Table I*

| Material | Temperature range | Average temp. coef. of mod. of elas. $e \times 10^{-6}$ | Average temp. of linear expansion $\beta \times 10^{-6}$ |
|---|---|---|---|
| Nickel | 293–700 | −356 | 13.0 |
| Iron | 180–850 | −320.2 | 12.3 |
|  | 1,120–1,800 | −1,430 |  |
| Carbon steel (0.5–0.6%) | 180–573 | −572.0 | 11.0 |
| Titanium | 0–2,075 | −481.0 | 8.5 |
| Copper | 293–560 | −328.0 | 16.98 |
| Silver | 293–740 | −460.0 | 19.68 |
| Aluminum | 185–560 | −493.0 | 23.8 |
| Phosphor Bronze | 223–323 | −360 to −400 | 17.0 |
| Beryllium Bronze (1.9% Be) | 223–323 | −350.0 | 17.0 |
| Duraluminum | 223–323 | −583.0 | 23.0 |
| Elinvar |  | −66.0 | 6.0 |
| Modulvar |  | +482.0 | 0 |
| Alloys: 92% Al, 4% Cu, 1.2% Mg, 1.2% Mn | 83–225, 223–343 | −460.0, −320.0 | 23 |
| 93% Al, 1.9% Cu, 0.8% Mg, 1.2% Ni, 1.4% Fe, 0.1% Ti, 0.6% Si | 83–217, 217–341 | −530.0, −310.0 | 23 |
| 97.5% Al, 0.1% Mn, 1.5% Si, 0.01% Mg, 0.8% Fe, 1.1% Cu | 83–203, 203–293 | −620.0, −340.0 | 23 |

Figure 3:
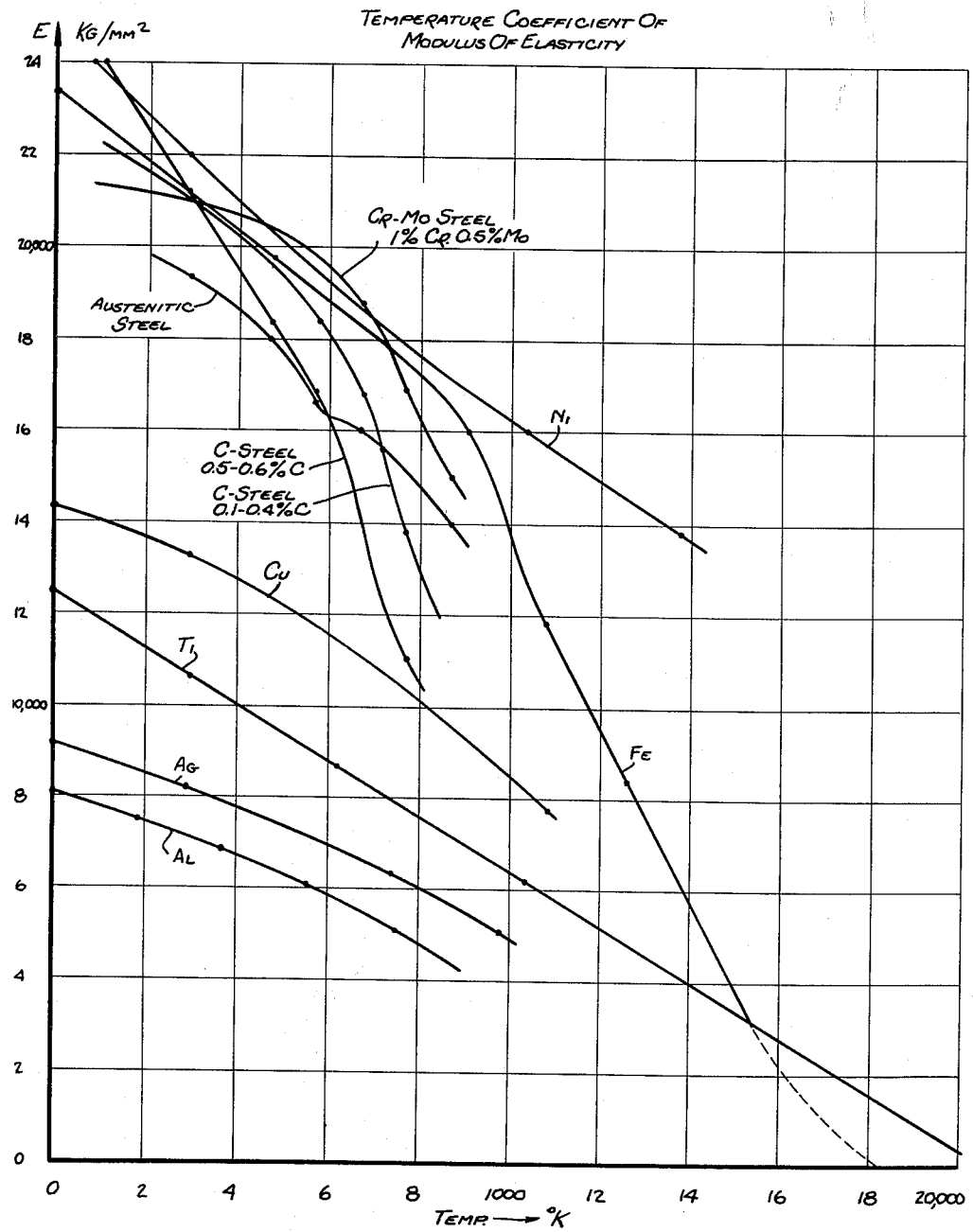
FIG. 3 is a graph showing the relationship between temperature coefficient and modulus of elasticity for various metals.

FIG. 3 shows the variation of the modulus of elasticity with temperature for some metals. This indicates the temperature sensitivity of the coefficients.

Both titanium and nickel exhibit a constant modulus coefficient over a wide temperature range. Medium carbon steel (0.5%–0.6%) shows the highest sensitivity to temperature over the range from 180° K. to 573° K. (−93° C. to +200° C.).

Temperature coefficients of frequency are given in Table II.

*Table II.—Average coefficient of frequency for a resonant fork constructed from various materials*

| Material | Temperature Range, ° K. | Temp. coef. of frequency, percent |
|---|---|---|
| Nickel | 293–700 | 0.0198 |
| Iron | 180–850 | 0.01786 |
|  | 1,120–1,800 | 0.0733 |
| Carbon steel (0.5–0.6%) | 180–573 | 0.0302 |
| Titanium | 0–2,075 | 0.0253 |
| Copper | 293–560 | 0.0189 |
| Silver | 293–740 | 0.026 |
| Aluminum | 185–560 | 0.0282 |
| Phosphor Bronze | 223–323 | 0.0205 to 0.023 |
| Beryllium Bronze | 223–323 | 0.02 |
| Duraluminum | 223–323 | 0.0326 |
| Elinvar |  | 0.0042 |
| Modulvar |  | 0.0241 |
| Alloys: |  |  |
| 92% Al |  |  |
| 4% Cu | 83–225 | 0.0265 |
| 1.2% Mg | 223–343 | 0.0195 |
| 1.2% Mn |  |  |
| 93% Al |  |  |
| 1.9% Cu |  |  |
| 0.8% Mg | 83–217 | 0.03 |
| 1.2% Ni | 217–341 | 0.0189 |
| 1.4% Fe |  |  |
| 0.1 Ti |  |  |
| 0.6% Si |  |  |
| 97.5% Al |  |  |
| 0.1% Mn |  |  |
| 1.5% Si |  |  |
| 0.01% Mg | 83–203 | 0.0350 |
| 0.8% Fe | 203–293 | 0.0205 |
| 1.1% Cu |  |  |

TESTS AND RESULTS

A resonant thermal transducer of the type shown in FIGS. 1 and 2 was constructed with a Phosphor bronze fork. The unit was subjected to the following tests to determine the following:

(i) Frequency stability,
(ii) Temperature coefficient of frequency,
(iii) Hysteresis.

Determine frequency stability in each of three positions over a twenty-four hour period.

(a) Temperature to be near ambient and maintained to ±1° C. over the measuring period.
(b) Frequency to be recorded to an accuracy of at least 1 part in $10^7$.
(c) Frequency to be recorded every ten minutes or more often.

Determine frequency vs. temperature and "hysteresis" effects.

(a) Temperature to be varied from −70° C. to +85° C. and back to −70° C.
(b) Frequency to be recorded every 10° C. to an accuracy of at least 1 part in $10^7$. The unit should be allowed to "soak" at a particular temperature for at least two minutes before a reading is taken.

The frequency stability test was conducted at +40° C. The average frequency over the twenty-four hour period was 331.6749 c.p.s. The standard deviation was 0.1023812 c.p.s. The variation of frequency with temperature is plotted in FIG. 4. The system was linear and repeatable over the range from −30° C. to +85° C. with a temperature coefficient of 0.0194%/° C. at +40° C.

BRIDGE BOLOMETER ARRANGEMENT

In a bolometer of the type shown in FIG. 1, the bolometer provides an output whose frequency varies as a function of ambient temperature. If this bolometer is used at an unattended weather station, its output could be amplified and transmitted directly over lines to a remote recording point where a frequency meter calibrated in terms of temperature would provide a direct reading. Alternatively, the output of the bolometer could be applied as a modulation on a low or high frequency carrier for carrier line or radio transmission, the signal being recorded at a receiving station by a suitable demodulator.

If the bolometer is to be made sensitive to some form of radiant energy and unresponsive to variations in ambient temperature, an arrangement such as is shown in FIG. 5 may be used, comprising two identical bolometers A and B of the type shown in FIG. 1, each enclosed in a housing sealed against radiation. The two bolometers are arranged in a bridge circuit including balancing resistors $R_A$ and $R_B$ whereby the outputs thereof cancel each other out, and as the output of one changes in response to variations in ambient temperature, the output of the other changes correspondingly to maintain equilibrium.

The bolometer A has an opening O in its casing to expose the root 11a of one tine to radiation focused thereon by a lens L. The root is the point of greatest sensitivity in the fork and this may be further enhanced by blackening its surface. Thus only bolometer A responds to radiant energy, and unbalances the bridge as a function of the intensity thereof. The output of the bridge is fed through a suitable amplifier Amp along a telemetering line to a remote meter M calibrated in terms of radiant energy.

While there have been shown preferred embodiments of resonant bolometers in accordance with the invention, it will be appreciated that many changes and modifications may be made therein without, however, departing from the essential spirit of the invention as defined in the annexed claims.

What is claimed is:

1. A resonant bolometer comprising
 (a) a tuning fork having a predetermined natural frequency and formed of a metallic composition having a relatively high temperature coefficient of the modulus of elasticity and providing a substantially linear change in frequency over a temperature range of about −30° C. to 85° C.,
 (b) an oscillator incorporating said fork and including means to excite said fork into vibration and to sustain oscillations at a frequency determined by said fork to generate an alternating wave whose frequency is proportional to temperatures within said range,
 (c) means to subject said fork to changes in temperature, and
 (d) a frequency meter coupled to said oscillator to indicate the temperature to which said fork is subjected.

2. A resonant bolometer comprising:
 (a) a tuning fork having a predetermined natural frequency and formed of a material having a relatively high temperature coefficient of the modulus of elasticity, said fork being constituted by a pair of tines interconnected by a base, the root of said tines being constricted,
 (b) means to excite said tuning fork into vibration and to sustain oscillation thereof to produce an alternating wave,
 (c) means to focus radiant energy on the root of one tine to effect a change in the temperature thereof and thereby to vary the frequency of said wave in accordance with the intensity of said energy, and
(d) means to measure said frequency to indicate the intensity of said energy.

3. A resonant bolometer responsive to radiant energy and insensitive to changes in ambient temperature, comprising:
(a) two identical tuning fork alternating-wave generators each including a tuning fork formed of a carbon steel material having a relatively high temperature coefficient of the modulus of elasticity and providing a substantially linear frequency change over a relatively broad temperature range,
(b) means to excite each of said forks into vibration and to sustain oscillation thereof to produce an alternating wave,
(c) a bridge circuit including said generators in a balanced arrangement whereby oscillations produced by the like response of said two forks to changes in ambient temperature are cancelled out,
(d) means to subject only one of said forks to radiant energy to unbalance said bridge accordingly to produce a change in the frequency of said oscillations as a function of said radiant energy, and
(e) means to measure said frequency to indicate said radiant energy.

4. A resonant bolometer responsive to radiant energy and insensitive to changes in ambient temperature, comprising:
(a) two identical tuning fork alternating-wave generators each including a tuning fork formed of a Phosphor bronze material having a relatively high temperature coefficient of the modulus of elasticity and providing a substantially linear frequency change over a relatively broad temperature range,
(b) means to excite each of said forks into vibration and to sustain oscillation thereof to produce an alternating wave,
(c) a bridge circuit including said generators in a balanced arrangement whereby oscillations produced by the like response of said two forks to changes in ambient temperature are cancelled out,
(d) means to subject only one of said forks to radiant energy to unbalance said bridge accordingly to produce a change in the frequency of said oscillations as a function of said radiant energy, and
(e) means to measure said frequency to indicate said radiant energy.

5. A resonant bolometer responsive to radiant energy and insensitive to changes in ambient temperature, comprising:
(a) two identical tuning fork alternating-wave generators each including a tuning fork formed of a material having a relatively high temperature coefficient of the modulus of elasticity and providing a substantially linear frequency change over a relatively broad temperature range, each fork being constituted by two tines having constricted roots,
(b) means to excite each of said forks into vibration and to sustain oscillation thereof to produce an alternating wave,
(c) a bridge circuit including said generators in a balanced arrangement whereby oscillations produced by the like response of said two forks to changes in ambient temperature are cancelled out,
(d) means to subject only one of said forks to radiant energy by concentrating said radiant energy on one of the roots thereof to unbalance said bridge to produce a change in the frequency of said oscillations as a function of said radiant energy, and
(e) means to measure said frequency to indicate said radiant energy.

6. A bolometer as set forth in claim 5, wherein said one root is blackened to enhance the response of the fork.

References Cited by the Examiner
UNITED STATES PATENTS

| | | | |
|---|---|---|---|
| 1,832,345 | 11/31 | Wright. | |
| 2,447,816 | 8/48 | Rieber | 331—156 X |
| 2,732,748 | 1/56 | Grib | 333—156 X |
| 2,935,711 | 5/60 | Christensen | 73—355 X |
| 2,971,323 | 2/61 | Hetzel | 331—156 X |
| 3,081,399 | 3/63 | Schwarz | 73—355 X |

ISAAC LISANN, *Primary Examiner.*